United States Patent
Wambeke et al.

(10) Patent No.: US 7,857,595 B2
(45) Date of Patent: Dec. 28, 2010

(54) MOLDED REINFORCED SHEAR WEB CORES

(75) Inventors: Dustin J. Wambeke, Greenville, SC (US); Nicholas K. Althoff, Newton, IA (US)

(73) Assignee: General Electric Company, Schenectady, NY (US)

( * ) Notice: Subject to any disclaimer, the term of this patent is extended or adjusted under 35 U.S.C. 154(b) by 242 days.

(21) Appl. No.: 12/209,734

(22) Filed: Sep. 12, 2008

(65) Prior Publication Data

US 2010/0068498 A1 Mar. 18, 2010

(51) Int. Cl.
*F01D 5/14* (2006.01)

(52) U.S. Cl. .............. 416/223 R; 416/226; 416/229 R; 416/230; 416/232; 416/241 R; 29/889.71

(58) Field of Classification Search ............. 416/223 R, 416/226, 229 R, 230, 232, 233, 241 R, 241 A; 29/889.7, 889.71

See application file for complete search history.

(56) References Cited

U.S. PATENT DOCUMENTS

| 4,295,790 A | 10/1981 | Eggert, Jr. | |
| 4,471,020 A * | 9/1984 | McCarthy | 428/309.9 |
| 2003/0116262 A1 * | 6/2003 | Stiesdal et al. | 156/245 |
| 2007/0041829 A1 | 2/2007 | Bonnet | |

FOREIGN PATENT DOCUMENTS

EP 1880833 A1 * 1/2008

* cited by examiner

*Primary Examiner*—Igor Kershteyn
(74) *Attorney, Agent, or Firm*—William F. Heinze; Ernest G. Cusick; Frank A. Landgraff

(57) ABSTRACT

A method of producing a shear web for a wind turbine blade includes providing a mold generally conforming to a shape of at least a portion of a shear web; and filling the mold with a closed cell structural foam.

8 Claims, 2 Drawing Sheets

US 7,857,595 B2

MOLDED REINFORCED SHEAR WEB CORES

BACKGROUND OF THE INVENTION

1. Technical Field

The subject matter described here generally relates to fluid reaction surfaces with specific blade structures that are formed with a main spar, and, more particularly, to wind turbine blades having molded shear webs.

2. Related Art

A wind turbine is a machine for converting the kinetic energy in wind into mechanical energy. If the mechanical energy is used directly by the machinery, such as to pump water or to grind wheat, then the wind turbine may be referred to as a windmill. Similarly, if the mechanical energy is converted to electricity, then the machine may also be referred to as a wind generator or wind power plant.

Wind turbines are typically categorized according to the vertical or horizontal axis about which the blades rotate. One so-called horizontal-axis wind generator is schematically illustrated in FIG. 1 and available from General Electric Company. This particular configuration for a wind turbine 2 includes a tower 4 supporting a nacelle 6 enclosing a drive train 8. The blades 10 are arranged on a hub to form a "rotor" at one end of the drive train 8 outside of the nacelle 6. The rotating blades 10 drive a gearbox 12 connected to an electrical generator 14 at the other end of the drive train 8 arranged inside the nacelle 6 along with a control system 16 that receives input from an anemometer 18.

The blades 10 generate lift and capture momentum from moving air that is them imparted to a rotor as the blades spin in the "rotor plane." Each blade is typically secured at its "root" end, and then "spans" radially "outboard" to a free, "tip" end. The distance from the tip to the root, at the opposite end of the blade, is called the "span." The front, or "leading edge," of the blade connects the forward-most points of the blade that first contact the air. The rear, or "trailing edge," of the blade is where airflow that has been separated by the leading edge rejoins after passing over the suction and pressure surfaces of the blade.

As illustrated in FIG. 2, the blades 10 for such wind turbines 2 are typically fabricated by securing various "shell" and/or "rib" portions to one or more "spar" members extending spanwise along the inside of the blade for carrying most of the weight and aerodynamic forces on the blade. The spars are typically configured as I-shaped beams having a web, referred to as a "shear web" 20, extending between two flanges, referred to as "caps" or "spar caps," that are secured to the inside of the suction and pressure surfaces of the blade. However, other shear web configurations may also be used including, but not limited to "C-," "L-," "T-," "X-," "K-." and/or box-shaped beams, and the shear webs 20 may also be utilized without caps. For example, U.S. Pat. No. 4,295,790 discloses a blade structure for use in a windmill with metal shear webs and subassemblies that are filled with approximately two pound cubic foot density rigid urethane foam.

Other conventional shear webs typically consist of a foam core that is coated by a resin-infused composite material. The core is typically formed from multiple foam sheets that are connected with adhesive and then trimmed to form the desired shape of the shear webs 20. These connected foam sheets inside of the shear web then act as a spacer for the composite material coatings on either side but do not provide much additional structural benefit to the shear web 20.

BRIEF DESCRIPTION OF THE INVENTION

These and other drawbacks associated with such conventional approaches are addressed here in by providing, in various embodiments, a method of producing a shear web for a wind turbine blade, including providing a mold generally conforming to the shape of at least a portion of a shear web; and filling the mold with a closed cell structural foam. Also provided is a wind turbine blade including a shear web having a joint-free closed cell structural foam core.

BRIEF DESCRIPTION OF THE DRAWINGS

Various aspects of this technology will now be described with reference to the following figures ("FIGs.") which are not necessarily drawn to scale, but use the same reference numerals to designate corresponding parts throughout each of the several views.

DETAILED DESCRIPTION OF THE INVENTION

Figure 1:
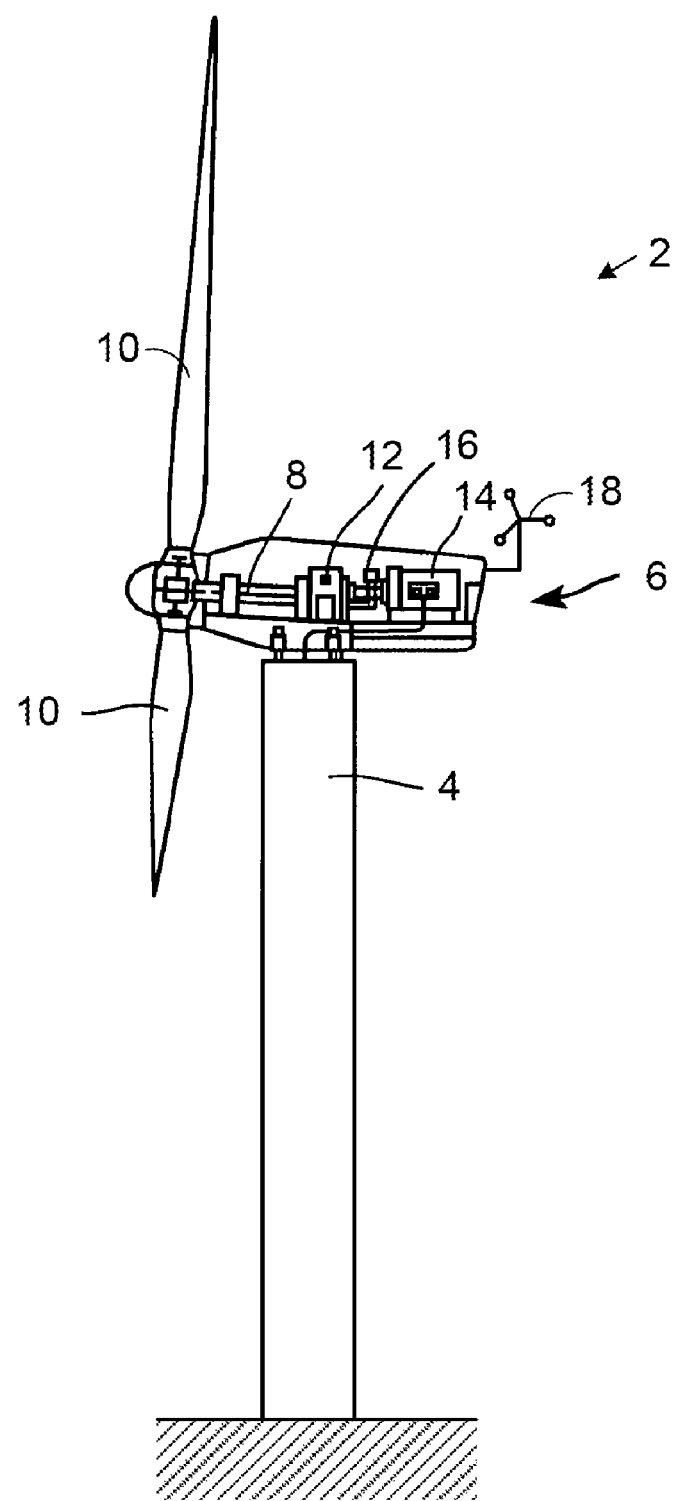
FIG. 1 is a schematic side view of a conventional wind generator.
Figure 2:
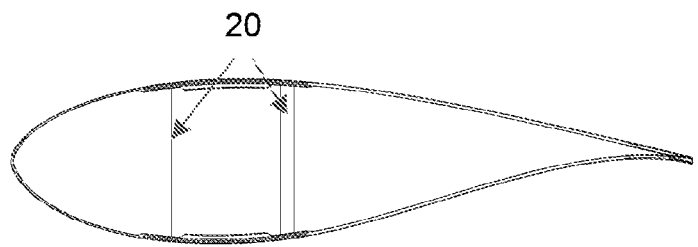
FIG. 2 is a schematic cross-sectional view of the blade shown in FIG. 1.
Figure 3:
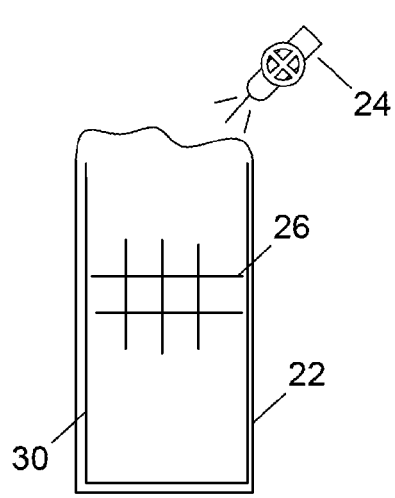
FIG. 3 is schematic cross-sectional view of a female mold for a shear web of a wind turbine blade.

FIG. 3 illustrates a schematic cross-sectional view of a female mold 22 for use in forming a shear web 20 for a wind turbine blade 10. The mold 22 generally conforms to the shape of the shear web and is filled or otherwise loaded with a liquid material, such as an expanding foam like a closed cell structural foam. For example, the liquid structural foam may be sprayed into the mold 22 via a nozzle 24 or other device. The foam will typically expand to the edges of the mold 22 and out any openings of the mold. However, the mold 22 may be provided with or without any such openings.

Optional reinforcing material 26 can also be added to the mold 22 in either a unidirectional or multi-directional pattern prior to spraying foam in order to increase the strength of the shear web 20. For example, the reinforcing material 25 may include loose fibers, netted fibers, composites, and/or other materials. The reinforcing material 25 may also include a reinforcing structure. Once the foam has cured, any excess material may be removed from any openings of the mold 22 using a knife 28 or other suitable tool as shown in FIG. 4.

Figure 5:
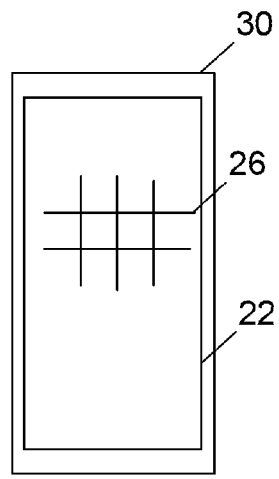
FIG. 5 is a schematic cross-sectional view of a molded shear web for a wind turbine blade.

As illustrated in FIG. 5, the molded and/or reinforced shear web consisting of foam and other structural material can then be wrapped or otherwise coated with a composite or structural fabric 30 or other material that is infused with a resin matrix in order to add the structural capacity to the shear web 20. The structural fabric 30 may also be infused with the resin matrix before or after it is wrapped and the structural fabric may be laminated onto the surface or infused with the resin matrix after it is wrapped. Alternatively, or in addition, the mold 22 may be lined with a composite or structural fabric 30, as shown in FIG. 3, that is infused prior to adding the reinforcing material 26 material and spraying the foam, leaving only the task of capping the cured shear web 20 with other composite material in order to form the shear web shape. Any structural fabric 30 in the mold may also be infused with resin after it is removed from the mold 20 on the least partially cured foam.

Figure 4:
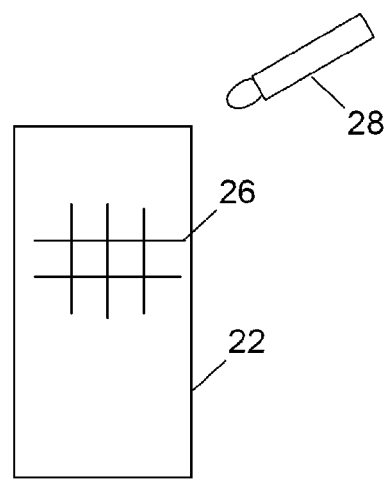
FIG. 4 is a schematic cross-sectional view of a female mold for a shear web of a wind turbine blade.
Figure 6:
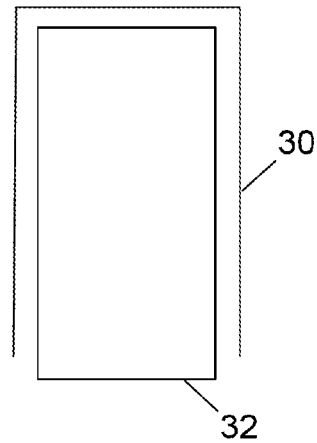
FIG. 6 is a schematic cross-sectional view of a male mold for a shear web of a wind turbine blade.

In addition to the female mold 22 shown in FIGS. 3-5, the molded and/or reinforced shear web core my be implemented using a male mold 32 as shown in FIG. 6. The male mold 32 generally conforms to the shape of the shear web core. Resin impregnated structural fabric 30 is loaded onto the outside of the male mold 32 in order to form the skin of the shear web 20. Slots may be provided in the surface of the male mold 32 for helping to disperse resin in the structural fabric 30. Once cured and removed from the mold, the shear web skin can be filled with a liquid material, such as an expanding foam like a closed cell structural foam, and any reinforcing material 26 in a similar manner to that shown in FIGS. 3 and 4.

The male mold 32 may also take the form of spacers or other structural material to which laminate sheets are applied. Resin impregnated structural fabric 30 is then applied to the top or bottom edges of the spaced sheets in order to form the remaining skin of the shear web 20. Once cured, the shear web skin can be filled with a liquid material, such as an expanding foam like a closed cell structural foam, and any reinforcing material 26 in a similar manner to that shown in FIGS. 3 and 4.

The technology described above provides various advantages over conventional approaches. For example, it helps provide tighter dimensional tolerances for the shear web 20 by eliminating the need to cut and position multiple foam sheet cores in a manual process that is time-consuming and prone to error. Any such dimensional discrepancies in the shear web can also lead to poor fitting of other components and/or other structural deficiencies in the blade 10. Given a reasonable cure time, spraying the foam into a mold is generally a faster process than cutting sheets and gluing them together in the appropriate shape. Scrap material waste is also reduced since any trimming only needs to be performed on material which protrudes from the top of the mold.

The technology described above also provides improved structural properties so as to enable the further reduction of material in the skin portion of the blade. For example, reinforcing material 26 helps to adds structural properties to the foam material that would otherwise not be provided by a simple spacer between the structural composite materials on the outside of the shear web. The process also offers improved structural integrity since the interior of the shear web 20 is no longer made up of multiple sheets. Furthermore, it eliminates the manual or automated process of cutting and gluing sheets of foam to form the shape of the shear web 20, and enables shear webs to be provided with greater thickness and/or a higher strength to thickness ratio, than might otherwise be available using conventional approaches. This, in turn, reduces the weight of the overall blade system.

It should be emphasized that the embodiments described above, and particularly any "preferred" embodiments, are merely examples of various implementations that have been set forth here to provide a clear understanding of various aspects of this technology. One of ordinary skill will be able to alter many of these embodiments without substantially departing from scope of protection defined solely by the proper construction of the following claims.

What is claimed is:

1. A method of producing a shear web for a wind turbine blade, comprising:
   providing a mold generally conforming to a shape of at least a portion of a shear web;
   filling the mold with a closed cell structural foam;
   allowing the closed cell structural foam to at least partially cure in the mold;
   removing the at least partially cured closed cell structural foam from the mold; and
   wrapping the removed and at least partial cured closed cell structural foam in a structural fabric that is infused with a resin matrix.

2. The method recited in claim 1, further comprising adding a reinforcing material to the mold.

3. The method recited in claim 1, further comprising lining the mold with a structural fabric.

4. A method of producing a shear web for a wind turbine blade, comprising:
   providing a mold generally conforming to a shape of at least a portion of a shear web; and
   filling the mold with a closed cell structural foam;
   adding a reinforcing material to the mold; and
   lining the mold with a structural fabric.

5. A method of producing a shear web for a wind turbine blade, comprising:
   providing a mold generally conforming to a shape of at least a portion of a shear web; and
   filling the mold with a closed cell structural foam;
   adding a reinforcing material to the mold;
   allowing the closed cell structural foam to at least partially cure in the mold;
   removing the at least partially cured closed cell structural foam from the mold; and
   wrapping the removed and at least partial cured closed cell structural foam in a structural fabric that is infused with a resin matrix.

6. The method recited in claim 5, further comprising lining the mold with a structural fabric.

7. A method of producing a shear web for a wind turbine blade, comprising:
   providing a mold generally conforming to a shape of at least a portion of a shear web;
   at least partially covering the mold with a resin impregnated structural fabric;
   at least partially curing the resin impregnated structural fabric;
   removing the cured resin impregnated structural fabric from the mold; and
   filling the removed resin impregnated structural fabric with a closed cell structural foam.

8. The method recited in claim 7, further comprising adding a reinforcing material to the closed cell structural foam.

* * * * *